United States Patent [19]

Smith et al.

[11] Patent Number: 4,727,486
[45] Date of Patent: Feb. 23, 1988

[54] HARDWARE DEMAND FETCH CYCLE SYSTEM INTERFACE

[75] Inventors: Michael D. Smith, Winchester; Llewelyn S. Dunwell, Lynn; Richard A. Lemay, Carlisle; Robert C. Miller, Braintree; Theodore R. Staplin, Jr., Chelmsford; William E. Woods, Natick; John L. Curley, North Andover, all of Mass.

[73] Assignee: Honeywell Information Systems Inc., Waltham, Mass.

[21] Appl. No.: 858,786

[22] Filed: May 2, 1986

[51] Int. Cl.⁴ .......................... G06F 9/00; G06F 9/22; G06F 9/30
[52] U.S. Cl. ..................................................... 364/200
[58] Field of Search ... 364/200 MS File, 900 MS File; 365/45, 48

[56] References Cited

U.S. PATENT DOCUMENTS

| | | | |
|---|---|---|---|
| 4,151,593 | 4/1979 | Jenkins et al. | 364/200 |
| 4,206,503 | 6/1980 | Woods et al. | 364/200 |
| 4,323,967 | 4/1982 | Peters et al. | 364/200 |
| 4,424,561 | 1/1984 | Stanley et al. | 364/200 |
| 4,538,223 | 8/1985 | Vahlstrom et al. | 364/200 |
| 4,598,359 | 7/1986 | Boothroyd et al. | 364/200 |

Primary Examiner—Gareth D. Shaw
Assistant Examiner—Joseph T. Fitzgerald
Attorney, Agent, or Firm—George Grayson; John S. Solakian

[57] ABSTRACT

A data processing system includes a central processor unit (CPU), a main memory and a memory management unit (MMU). Information is stored in main memory in segments, each segment being identified by a segment descriptor stored in a translation table in the MMU. Logical addresses from the CPU address segment descriptors in the MMU's translation table. These segment descriptors include the physical address of the location in main memory of the first word of the segment. If the segment descriptor is not in the translation table location, then the MMU operation is suspended while the segment descriptor is demand fetched from main memory.

12 Claims, 14 Drawing Figures

HARDWARE DEMAND FETCH CYCLE SYSTEM INTERFACE

RELATED APPLICATIONS

The following patent application, which is assigned to the same assignee as the instant application, has related subject matter and is incorporated herein by reference: U.S. patent application entitled, "Present Bit Recycle and Detect Logic for a Memory Management Unit", with inventors Llewelyn S. Dunwell, Richard P. Brown, Arthur Peters and John L. Curley, filed on Apr. 7, 1986 and having Ser. No. 848,513.

BACKGROUND OF THE INVENTION

1. Field of the Invention

This invention relates generally to the field of data processing system and more particularly to the logic for stalling a memory management unit while a segment descriptor which indicates the main memory address of the segment containing the desired information is fetched.

2. Description of the Prior Art

In order for data processing systems to operate more efficiently in a multiprogram environment, the information in main memory is organized in segments. When the data processing system is required to execute a program for an additional job, the operating system must find room in main memory for the program as well as the information to be processed by the program. The operating system, therefore, will assign an area of memory for the information and, if necessary, for the program. The information stored in the area will be in the form a segment, that is, there will be a main memory address of the location of the first word of the segment and there will be a number of consecutive locations, typically 128 or 256 locations, in which the remaining words of the segment are stored. The address of a location storing a requested word is generated by adding a displacement to the address of the location of the first word.

Since the information may end up at any physical address location in main memory and the program must access the data, the program will keep a logical address of the requested location. Therefore, when the operating system assigns memory space to the information, it must provide a translation from the logical address to the physical address. The operating system will therefore generate a translation table made up of segment descriptors.

There is a segment descriptor for each segment of main memory. The segment descriptor includes the main memory physical address of the first word of the segment. The logical address is applied to the translation table to read out the appropriate segment descriptor.

In the prior art systems, if the addressed segment descriptor is not stored in the segment table, the operating system calls to a firmware routine to fetch the segment descriptor and store it in the translation table. Then, the firmware returns to the software to again address the translation table with the logical address. This time the segment descriptor is stored in the translation table and the physical address is calculated by adding the displacement to the physical address included in the segment descriptor. The length of time it takes to address the translation table for the segment descriptor, to use the firmware routine to fetch the segment descriptor and to readdress the translation table is excessive. Such a segmentation system using segment descriptors is described in U.S. Pat. No. 4,320,451 entitled, "Extended Semaphone Architecture".

OBJECTS OF THE INVENTION

Accordingly, it is a primary object of the invention to have an improved data processing system.

It is an object of the present invention to have a data processing system with an improved memory management system.

It is another object of the present invention to have a memory management system with an improved translation table apparatus operation.

It is yet a further object of the present invention to have a memory management system with apparatus for reducing the overall processing time for fetching a required segment descriptor that was not present in the translation table.

This invention is pointed out with particularity in the appended claims. An understanding of the above and further objects and advantages of this invention can be obtained by referring to the following description taken in conjunction with the drawings.

SUMMARY OF THE INVENTION

A data processing system includes a central processor unit (CPU), a main memory, both coupled to a system bus and an extended memory management unit (EMMU). The main memory stores data in segments. A segment typically includes up to 256 16 bit words.

The EMMU includes a translation table for storing segment descriptors, each containing the physical address of the location of the first word of the segment in main memory. The CPU requests data from main memory by sending a logical address to the EMMU. This logical address addresses a location in the translation table which stores the segment descriptor. The EMMU adds a displacement to the beginning physical address of the segment to generate the main memory address of the location of the data word within that segment.

If the segment desriptor is not present in the translation table of the EMMU, then the normal operation of the EMMU and CPU are suspended and a request is made of main memory through the CPU for the desired segment descriptor. This is accomplished by first stalling the CPU clock to stop normal EMMU and CPU operation.

Then, logic is provided for temporarily overriding the stalled clock cycles to create system bus address and control signals for initiating a demand fetch cycle to obtain the requested segment descriptor from main memory.

The EMMU generates the address of the location in main memory storing the segment descriptor by adding the translation table offset of the missing segment descriptor to a segment descriptor table physical base address and sends the result to the CPU.

The CPU requests the system bus to initiate the demand fetch operation to read the segment descriptor out of main memory and sent it to the EMMU where it is stored in the translation table location specified by the logical address.

Normal operation is continued by the EMMU generating a main memory address using the physical address of the now present segment descriptor adding the displacement, and asking the CPU to request the system bus for the data requested by the program.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 9A is a detailed diagram of an EMMU Segment Descriptor.

DESCRIPTION OF THE PREFERRED EMBODIMENT

Figure 1:
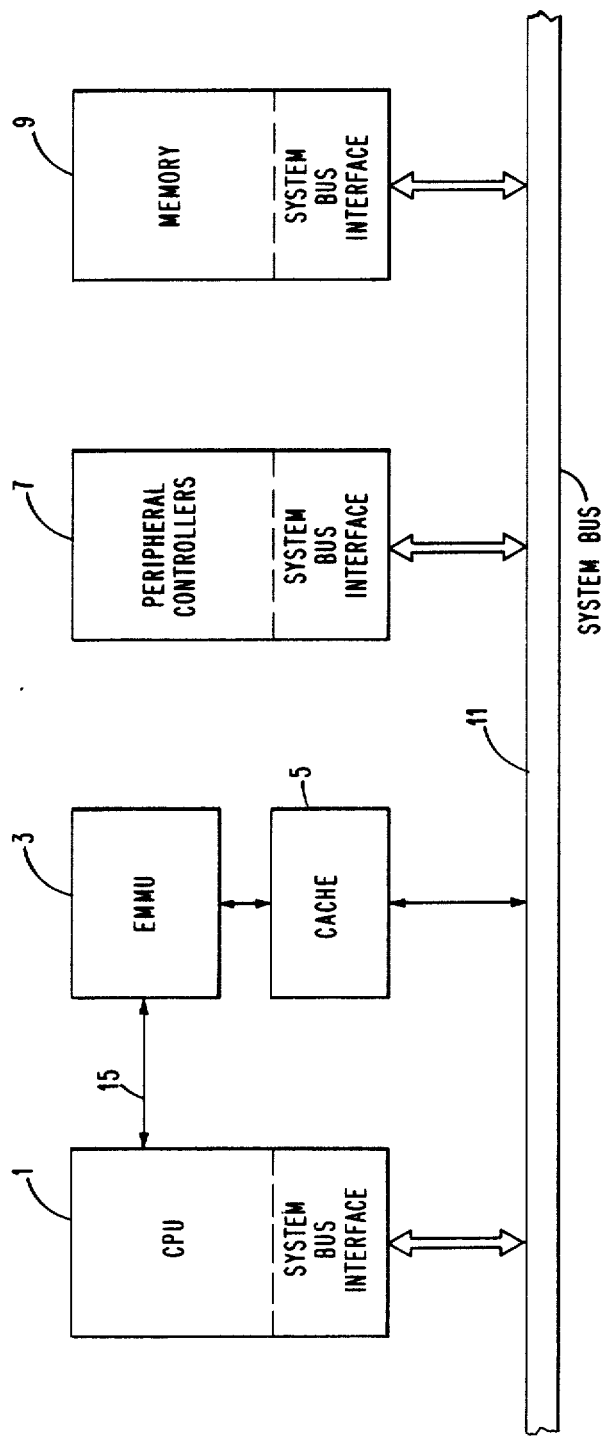
FIG. 1 is a block diagram of the overall data processing system.

FIG. 1 shows an overall block diagram of a data processing system 13. A main memory 9 stores information in word locations of 16 bits per word. The words are organized in segments of no more than 128 words of each segment. An extended memory management unit (EMMU) 3 includes a logical address to physical address translator. The translator stores up to 128 segment descriptors, each segment descriptor including a physical address which represents the location in main memory 9 of the first word of the respective segment.

A central processor unit (CPU) 1 sends the logical address for a word stored in main memory 9 to the EMMU 3 over a local bus 15. The EMMU reads the segment descriptor from a translation table and adds a displacement to the physical address portion of the segment descriptor to generate the actual main memory 9 address of the required word. Since the physical portion of the segment descriptor is the location of the first word of the segment, adding the displacement gives the location of the requested word in the segment. The logical address is the address defined by the software. The operating system assigned the information to segments at physical addresses in main memory 9, and also developed a translation table to indicate the actual address location in main memory 9 at which the information is stored.

The EMMU 3 either sends the actual address back to the CPU 1, which uses it to request the information from main memory 9, or, if the cache is enabled, the EMMU 3 sends the actual address to a cache 5. The cache 5 includes information presently stored in main memory 9 which has a high probability of being used on the present software routine being processed by the system 13. If the information is not stored in cache 5, then the cache 5 will request the information from main memory 9.

The CPU 1, a number of peripheral controllers, and main memory 9 are all coupled in common to a system bus 11 by means of a bus interface. The bus interface is described in U.S. Pat. No. 4,030,075 entitled, "Data Processing System Having Distributed Priority Network". Cache 5 is coupled directly to the system bus 11. If cache 5 does not have the information request by the EMMU 3, it will get that information as well as a number of words in adjacent locations from main memory 9 for storage in cache 5. On a probability basis, the word in the next location will be requested as the next fetch cycle.

Figure 2:
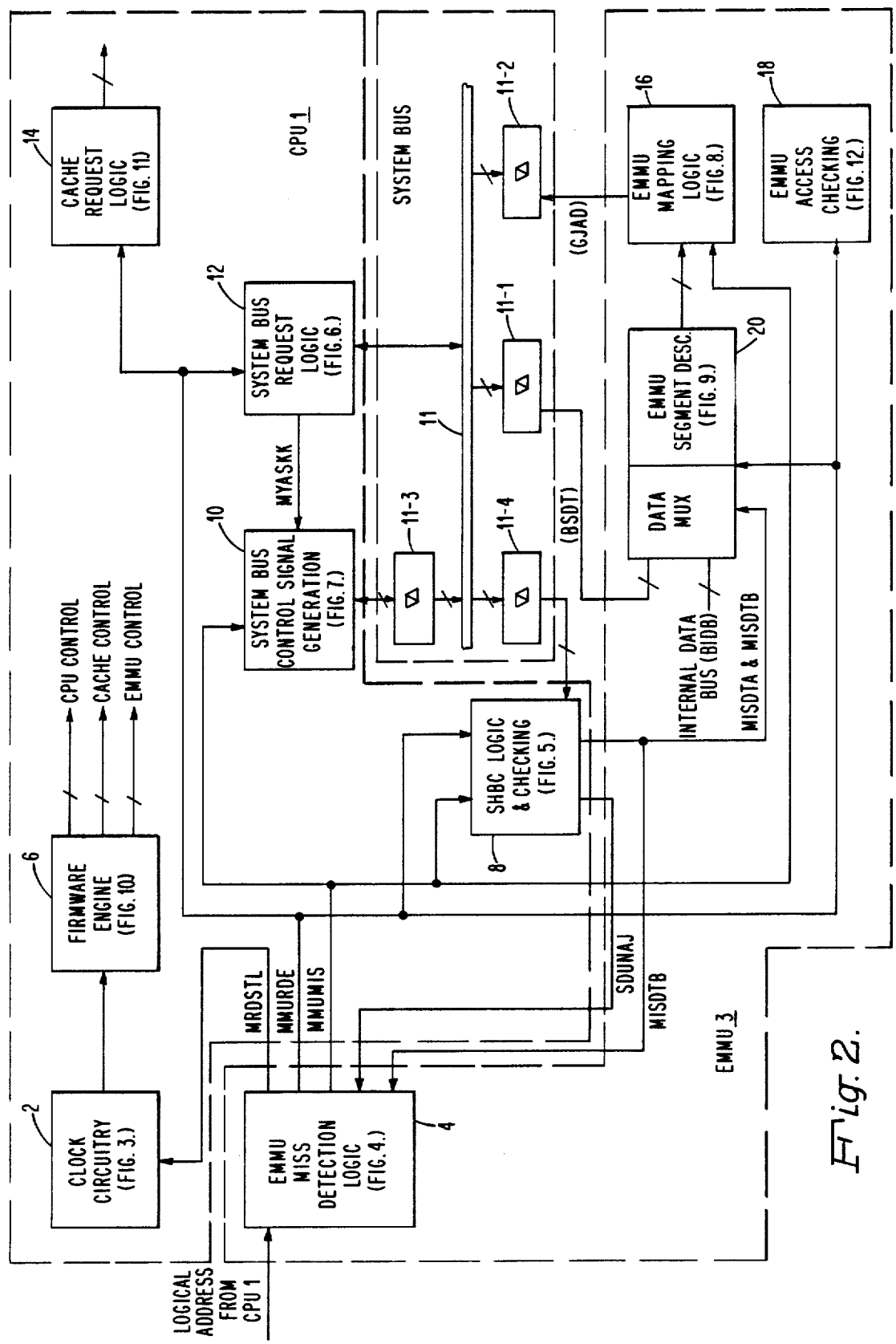
FIG. 2 is a detailed block diagram of the CPU and EMMU demand fetch operation.

FIG. 2 is a block diagram of the EMMU 3, CPU 1, and a portion of the system bus 11 showing the logic blocks involved in stalling the EMMU 3 operation for the case in which the requested segment descriptor is not stored in the translation table and demand fetch of the requested segment descriptor from main memory 9. Since the segment descriptor contains 32 bits and information is stored in main memory 9 in 16 bit words, two system bus 11 cycles are required to transfer the two word segment descriptor to the translation table of the EMMu 3 from main memory 9.

An EMMU 3 miss detection logic 4 stores the segment descriptor translation table and receives the logical address from CPU 1 over local bus 15 to read out the segment descriptor stored in the translation table at the location specified by the logical address. If the segment descriptor is not present at that logical address location, then signal MMURDE is generated to indicate a missing segment descriptor. Signal MMUMIS is generated to control the system bus demand fetch cycle, and signal MRDSTL is generated to stall the EMMU 3 clock logic. This initiates the demand fetch operation which will send the two word segment descriptor from main memory 9 over system bus 11 to EMMU 3 for storage in the translation table. Receiving the segment descriptor will enable the normal sequence to continue by restarting the stalled clock and requesting access to system bus 11 or cache 5.

Clock circuitry 2, generates the EMMU 3 cyclic clock signal MCLOCK. However, on receiving the clock stall signal MRDSTL, the EMMU 3 cyclic clock signal MCLOCK is prevented from cycling until the two word segment descriptor is received from main memory 9.

A firmware engine 6 includes a control store memory which stores cotrol signals to control the CPU 1, the cache 5 and the EMMU 3 operation. When the clock signal MCLOCK is stalled, the firmware engine is prevented from cycling through the normal sequence thereby keeping EMMU 3 from performing its normal functions until the segment descriptor is received by the EMMU 3.

The second half bus cycle logic 8 is responsive to the MMURDE and MMUMIS signals to generate a signal MISDTA which controls the first word of the segment descriptor received over system bus 11 from main memory 9, and a signal MISDTB which controls the second word of the segment descriptor and indicates that the demand fetch operation is concluded.

Also generated is signal SDUNAV to indicate to EMMU miss detection logic 4 that the system bus 11 did not acknowledge a request for main memory 9 and that the clock should be restarted with a system error indicated.

System bus request logic 12 provides a signal MYASKK in response to signal MMUMIS to request the system bus 11 for the demand fetch operation and also to execute the original operation after the requested segment descriptor is received by EMMU 3. System bus control signal generation 10 responds to the MYASKK signal to request the system bus 11 and also to provide a bus signal indicating a two word fetch and that this is a demand fetch operation. The logic is responsive to an acknowledge signal from system bus 11 to connect the EMMU 3 to the system bus 11 and also to send out a number of control signals including a signal to cause a double pull cycle to request two words from main memory 9 and also a signal to indicate that this is a demand fetch request.

EMMU wrapping logic 16 generates a main memory 9 address GJAD of the location of the segment descriptor by adding the displacement of the missing segment descriptor to a segment descriptor table physical base address and sends that address out over system bus 11 via 23 address signals GJAD and 23 drivers 11-2.

EMMU segment descriptor/data mux 20 receives the two words over the data bus (BSDT) portion of system bus 11 via receivers 11-1. Signal MISDTA steers the first word and signal MISDTB steers the second word into the translation table.

Cache request logic 14 controls the CPU 1 accesses of the cache 5 when the CPU 1 will request data from the cache 5. Signal MMURDE suppresses the cache request logic 14 from requesting cache during the demand fetch operation.

EMMU access checking 18 receives the MMURDE signal to suppress access error checking during the demand fetch cycle. Without this suppression, spurious checking errors could occur.

Figure 3:
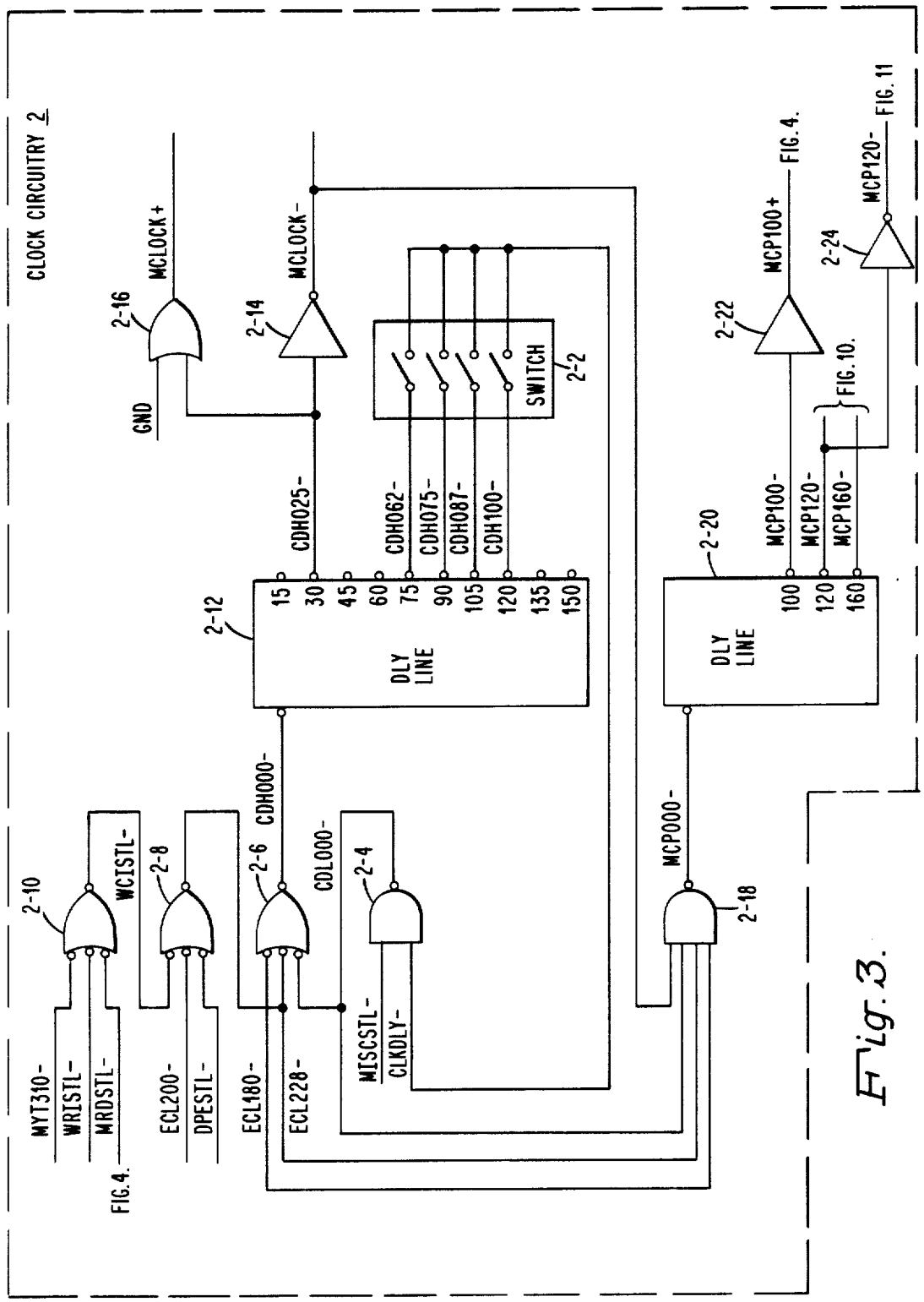
FIG. 3 is a detailed diagram of the clock circuitry.

FIG. 3 shows the detailed logic of clock circuitry 2 of CPU 1 which generates complementary clock signals MCLOCK+ and MCLOCK−. Each signal in the typical case is high for 80 nanoseconds and low for 80 nanoseconds. The clock signals are generated by recirculating a clock delay signal CLKDLY− through a delay line 2-12. A switch 2-2 is set to adjust the 80 nanosecond timing for the clock cycles.

To start, assume signal CLKDLY− is high when applied to a NAND gate 2-4. This sets signal CDL000− low. Signal CDL000− is applied to a negative NOR gate 2-6. Output signal CDH000− goes low and is applied to an input terminal of delay line 2-12 to generate signal CLKDLY− which goes low 80 nanoseconds later. The timing of signal CLKDLY− is set by means of switches 2-2 which sets one or more delay line signals CDH062−, CDH075−, CDH087−, and CDH100− from terminals 75, 90, 105 and 120. The 150 nanosecond delay output pin of delay line 2-12 is grounded.

Clock delay signal CLKDLY− low causes output signal CDL000− from NAND gate 2-4 to go high. Assuming ECL180− and ECL228− are high, negative NOR gate 2-6 output signal CDH000− goes high. Eighty nanoseconds later, clock delay signal CLKDLY− again goes high and the cycle repeats.

During each 80 nanosecond cycle signal CDH025− from delay line 2-12 follows signal CDH000− delayed by approximately 25 nanoseconds thereby generating clock signal MCLOCK+ via an OR gate 2-16 and complementary clock signal MCLOCK− via an inverter 2-14.

Clock signals MCLOCK+ and MCLOCK− may be stalled for a number of reasons as indicated by signal MISCSTL− going low. This would cause signals CDL000−, CDH000− and CLKDLY− to remain high so that clock signal MCLOCK+ remains high and clock signal MCLOCK− remains low.

Figure 4:
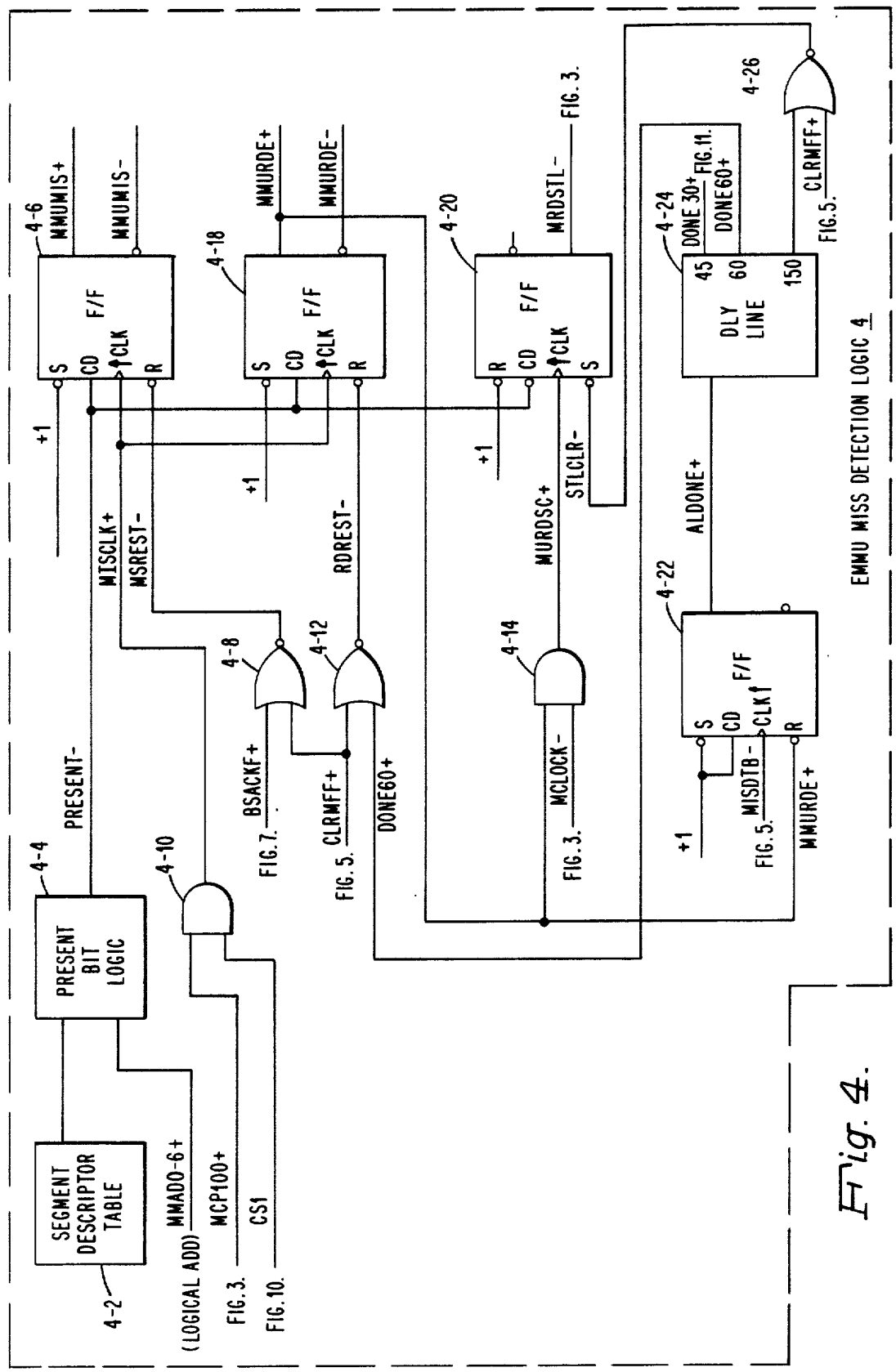
FIG. 4 is a detailed diagram of the EMMU miss detection logic.

When EMMU 3 receives a request for a segment descriptor and that segment descriptor is not present, then EMMU 3 forces two system bus 11 cycles to read the 32 bit segment descriptor from main memory 9. Information stored in main memory 9 is organized in 16 bit words. Since each segment descriptor is 32 bits wide, two system bus cycles are required to transfer each segment descriptor from main memory 9 to EMMU 3. EMMU 3 is placed in a stall mode for the time it takes EMMU 3 to send the address information to main memory 9 and system bus 11 and to receive the two words from main memory 9 over system bus 11. Signal MRDSTL− from flop 4-20, FIG. 4, is applied to a negative NOR gate 2-10 and is set low to stall the clock. Signal MYT310− stalls the clock when an address received by cache 5 doesn't exist and signal WRISTL− stalls the clock under firmware control. Output signal WCISTL−, which is applied to a negative NOR gate 2-8, is forced low. The output signal ECL228− which is applied to negative NOR gate 2-6 causes signal CDH000− to remain low as long as the stall signal MRDSTL− remains low. Therefore, clock delay signal CLKDLY− remains low causing signal CDL000− to go high, but this has no effect on negative NOR gate 2-6 since signal ECL228− is low. Clock signals MCLOCK+ remain low and MCLOCK− remain high. Signal ECL180 adds 20 nanoseconds to the clock and signal ECL200 adds 40 nanoseconds to the clock as required by the firmware.

A clock signal MCP100+, which lags clock signal MCLOCK− by approximately 70 nanoseconds, is generated via a delay line 2-20 and an inverter 2-22 and is applied to an AND gate 4-10, FIG. 4. Signals MCLOCK−, CDL000−, ECL228− and ECL180− are applied to a NAND gate 2-18 to generate clock signal MCP000+, which in turn is applied to the input terminal of delay line 2-20. Note that signal MCP100+ will also lag the stretched clock cycles initiated by signals ECL180− and ECL200− by approximately 70 nanoseconds. Signals MCP120− and MCP160− are also generated by delay line 2-20 and lag signal MCP100− by approximately 20 and 60 nanoseconds respectively and are applied to a flop 6-20, FIG. 10. Also, signal MCP120− is generated by an inverter 2-24.

FIG. 4 shows the EMMU miss detection logic 4. A segment descriptor table 4-2 stores each of typically 128 segment descriptor words which include a physical address in main memory 9 of the first word of each segment. A displacement is added to the physical address portion of an addressed segment descriptor in the EMMu 3 and the result is the actual address of the desired EMMU 3 16 bit word location in main memory 9.

The present bit logic 4-4, which is in described the related patent application entitled, "Present Bit Recycle and Detect Logic for a Memory Management Unit", determines if the addressed segment descriptor is stored in the segment table 4-2. If the segment descriptor is not present in the segment descriptor table 4-2, then the signal PRESENT— from present bit logic 4-4 goes high which conditions flops 4-6 and 4-18 to set on the rise of the clock signal MISCLK+. Clock signal MISCLK+ is generated by timing signal MCP100+ from FIG. 3 and control store signal CS1 from FIG. 10 applied to an AND gate 4-10.

EMMU 3 now starts a system bus 11 cycle to fetch the required segment descriptor word from main memory 9. Since the segment descriptor is 32 bits wide and main memory 9 stores 16 bit words, a two word fetch is needed. Signals MMURDE+ and MMURDE— from flop 4-18 are active for the complete double fetch cycle and signals MMUMIS+ and MMUMIS— from flop 4-6 are active until the main memory 9 acknowledges the demand fetch access at which time the signals MMUMIS+ and MMUMIS— are reset to their original state.

EMMU 3 halts its operation while waiting for the segment descriptor from main memory 9 by preventing the clock signals MCLOCK+ and MCLOCK— from cycling. This is accomplished by first setting the clock stall flop 4-20. Signal MMURDE+ is applied to an AND gate 4-14. On the next cycle in which clock signal MCLOCK— goes high, signal MURDSC+ from AND gate 4-14 which is applied to a clock input terminal of flop 4-20 goes high, setting flop 4-20. Output signal MRDSTL— is applied to negative NOR gate 2-10 of FIG. 3 and, when low, stalls the clock delay signal by forcing signals MCLOCK+ to remain low and MCLOCK— to remain high until the segment descriptor word is received from main memory 9.

Figure 5:
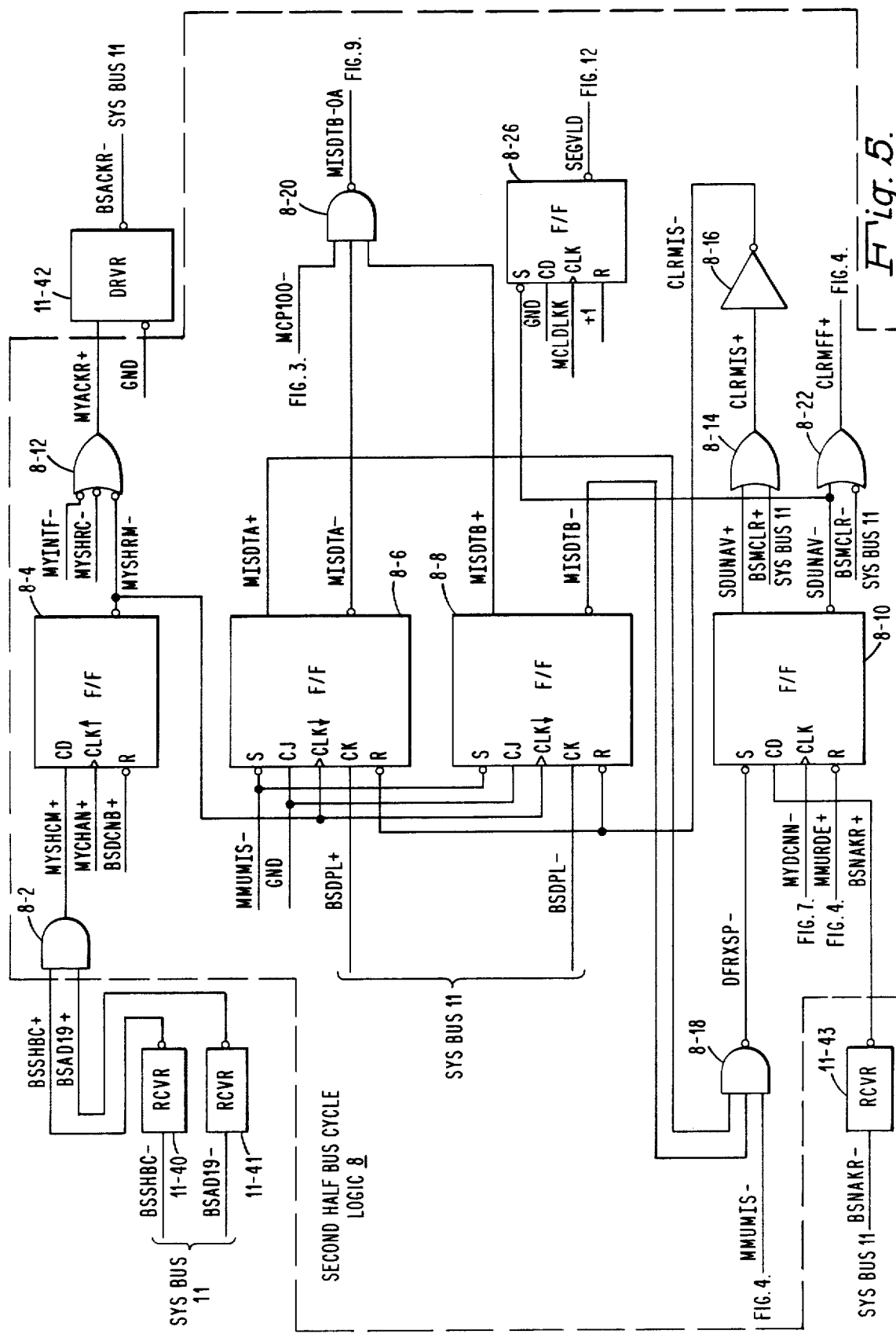
FIG. 5 is a detailed diagram of the second half but cycle logic.

FIG. 5 shows the second half bus cycle logic 8 which generates signals MISDTA+ and MISDTA— which are active during the demand fetch cycle of the first word of the segment descriptor from main memory 9 and signals MISDTB+ and MISDTB— which are active during the demand fetch of the first and second words of the segment descriptor from main memory 9 over system bus 11.

Signal MMUMIS— going low sets both flops 8-6 and 8-8 forcing output signals MISDTA+ and MISDTB+ high and MISDTA— and MISDTB— low.

Figure 6:
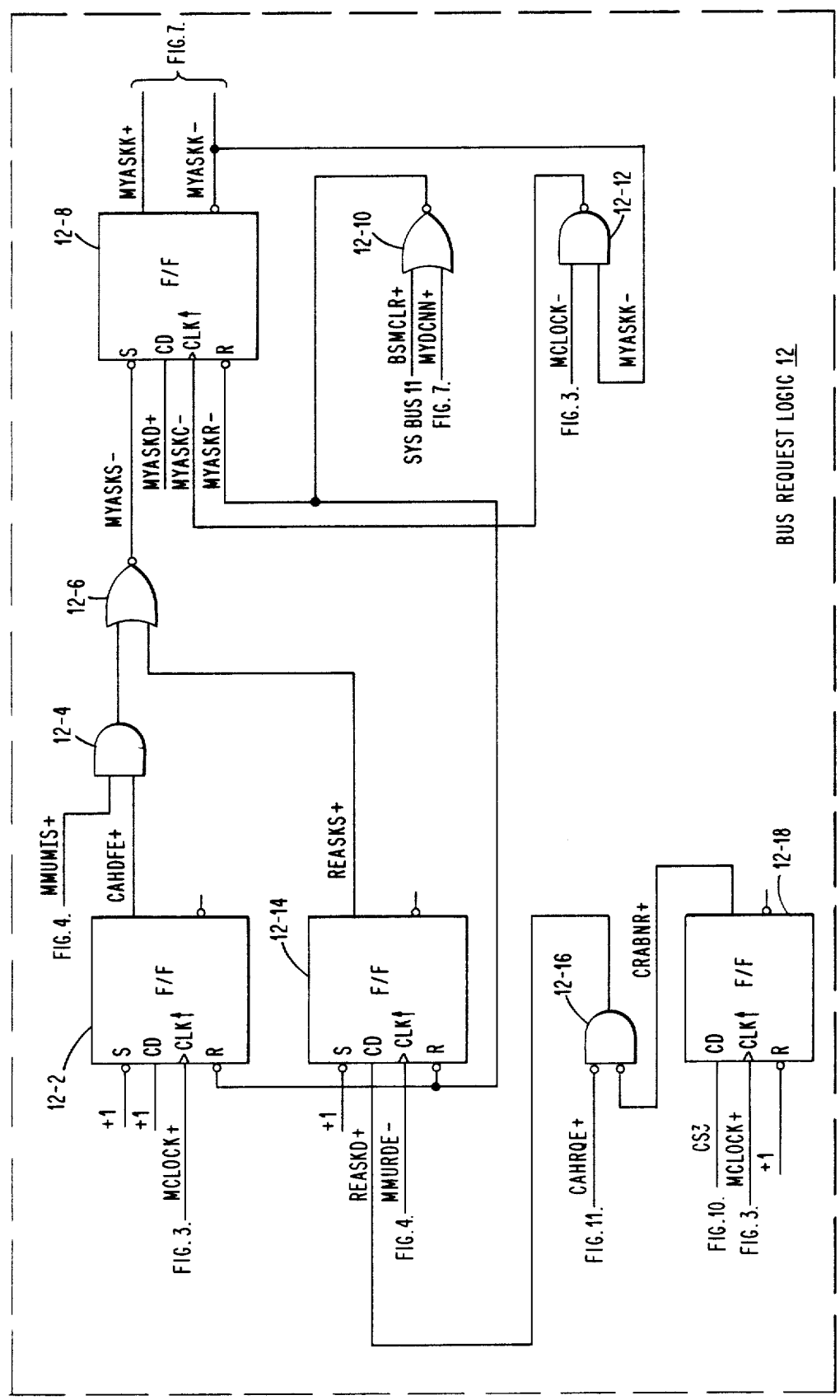
FIG. 6 is a detailed diagram of the bus request logic.

FIG. 6 shows the bus request logic 12. A flop 12-2 sets on the rise of the clock signal MCLOCK+ so that signal CAHDFE+ applied to an AND gate 12-4 goes high. Signal MMUMIS+, FIG. 4, is also high at this time and is applied to the other input terminal of AND gate 12-4 causing output signal MYASKS— from a NOR gate 12-6 to go low. This sets a flop 12-8 forcing output signals MYASKK+ high and MYASKK— low.

Figure 7:
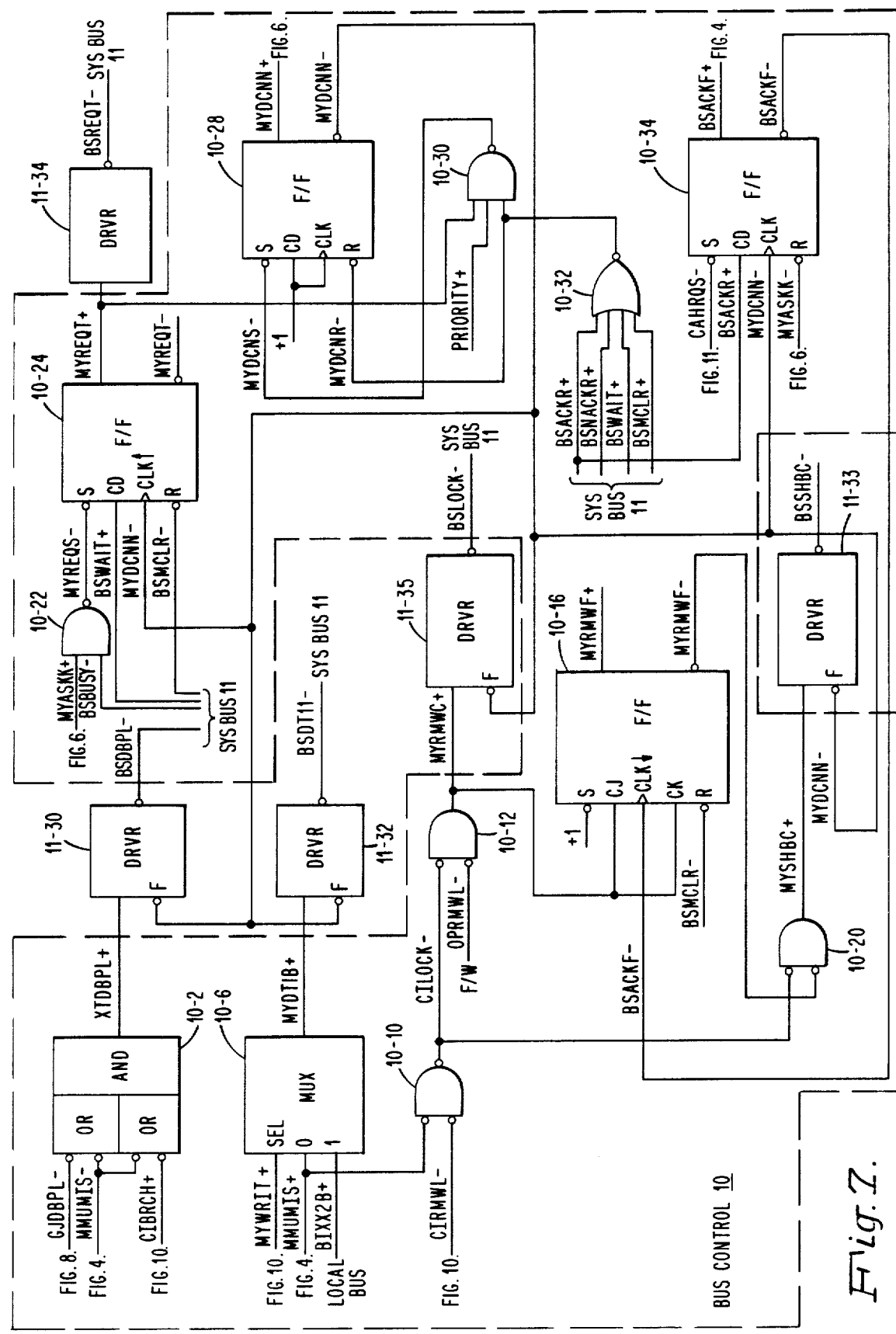
FIG. 7 is a detailed diagram of the bus control logic.

FIG. 7 shows the bus control 10 logic which captures system bus 11 if there is no higher priority unit requesting system bus 11. Signal MYASKK+, FIG. 6, when high, requests the system bus 11 when it is not busy as indicated by bus busy signal BSBUSY— being high. Both signals high are applied to a NAND gate 10-22. Output signal MYREQS— going low sets flop 10-24 forcing output signal MYREQT+ high. This puts a request for system bus 11 out on the bus via a driver 11-34 and signal BSREQT—.

If CPU 1 has highest priority requesting system bus 11, signal PRIORITY+ is high, and the following response signals applied to a NOR gate 10-32 are low, bus acknowledge signal BSACKR+, bus not acknowledge signal BSNACKR+, bus wait signal BSWAIT+ and system clear signal BSMCLR+, then CPU 1 may connect to system bus 11.

The my data cycle now flop 10-28 sets since signal MYDCNS— is low via a NAND gate 10-30, since signals MYREQT+ PRIORITY, and MYDCNR— are high. Flop 10-28 being set forces signals MYDCNN+ high and MYDCNN— low and CPU 1 and EMMU 3 now have access to system bus 11.

Signal BSDBPL— is sent out over system bus 11 to indicate to main memory 9 that two memory fetch cycles are required to send the segment descriptor to EMMU 3. Since signal MMUMIS— applied to a negative OR/AND gate is low, output signal XTDBPL+ applied to a driver 11-30 is high. Since signal MYDCNN— is low, driver 11-30 generates system bus 11 signal BSDPL—.

Tag bit BSDT11— is sent out over system bus 11 via a driver 11-32 when signal MYDCNN— is low. A MUX 10-6 selects signal MMUMIS+, FIG. 4, which is high to force signal MYDT1B+, which is applied to driver 11-32, high thereby generating signal BSDT11—. Signal MYWRIT+ is low at this time since this is a read operation. During a main memory write operation, local bus signal BIXXIB+ would be sent out over system bus 11.

When CPU 1 receives an acknowledge signal BSACKR+, a not acknowledge response BSNACKR+, or a wait response BSWAIT+, applied to NOR gate 10-32 goes high forcing flop 10-28 to reset via signal MYDCNR— going low and signal MYDCNS— from NAND gate 10-30 going high.

When signal MYDCNN+ went high, it reset flop 12-8, FIG. 6, since signal MYASKR— from NOR gate 12-10 went low. The system clear signal BSMCLR+ is low at this time. Flop 12-8 resetting forces signal MYASKK+ low and MYASKK— high. Note that the signal NYASKK—, when high, conditions flop 12-8 to set on the fall of clock signal MCLOCK— via a NAND gate 12-12 and the rise of signal MYASKC— when signal MYASKD+ is high.

Flop 10-24, FIG. 7, is reset on the rise of signal MYDCNN— since signal MYASKK+ applied to NAND gate 10-22 is now low. Note that if the system bus 11 response had been wait and signal BSWAIT+ was high, flop 10-24 would remain set and signal BSREQT— would again request the system bus 11 as before.

A flop 10-34 sets on the rise of signal MYDCNN— if the acknowledge signal BSACKR+ is received high forcing signal BSACKF+ high. Signal CAHRQS— is forced high by signal MMURDE— low applied to a NAND gate 14-10 which in turn prevents flop 14-16 from setting thereby suppressing a cache request cycle.

Referring to FIG. 4, signal BSACKR+ high applied to a NOR gate 4-8 forces reset signal MSREST— low resetting flop 4-6. This forces signals MMUMIS+ low and MMUMIS— high.

The memory lock signal BSLOCK— and the second half bus cycle signal BSSHBC— remain high. That is, the signals are inactive. Signal MMUMIS+ going low forces output signal CILOCK— from negative NAND gate 10-10 low. Control store signal CIRMWL— is low at this time. Therefore, signal MRYMWC+ from negative AND gate 10-12 is high. However, signal MYDCNN— is high at this time therefore clock signal BSLOCK— remains high and therefore inactive.

Also, flop 10-16 sets on the fall of acknowledge signal BSACKF— forcing signal MYRMWF— low. Signal MYSHBC+, the output of negative AND gate 10-20, is high. However, signal MYDCNN— is high therefore the second half bus cycle signal BSSHBC— remains high and therefore inactive.

Figure 8:
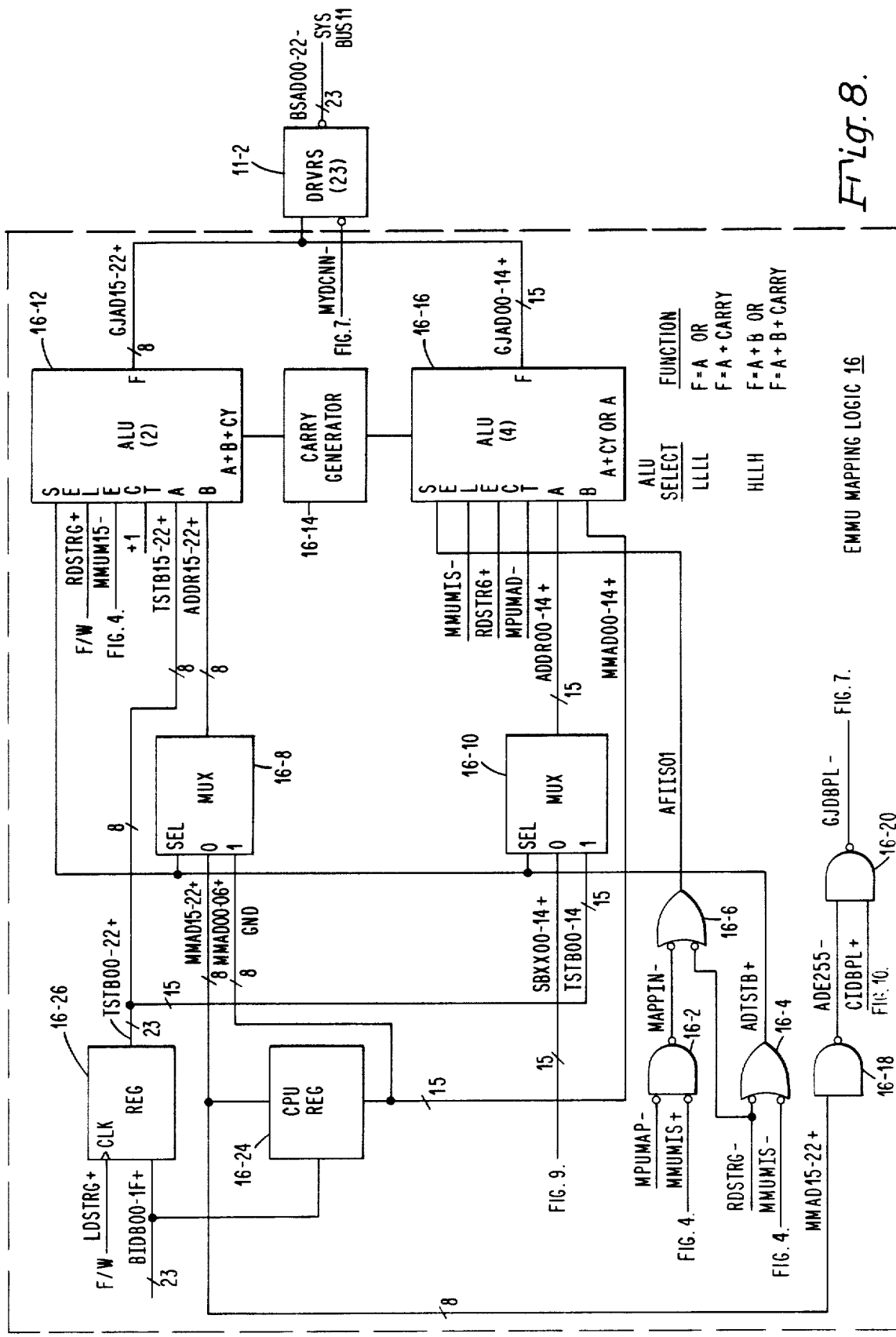
FIG. 8 is a detailed diagram of the EMMU mapping logic.

FIG. 8 shows the EMMU mapping logic 16 which generates the address of the location in main memory 9 which store the segment descriptor. The starting address of the segment descriptor table in main memory 9 is stored in a register 16-26 at the start of this software job by control store signal LDSTRG+. The address of the required segment descriptor is generated by adding the 23 bit base address signals TSTB00+ through TSTB22+ from register 16-26 to an 8 bit offset, signals MMAD00+ through MMAD06+ from a CPU register 16-24. The eighth signal is a ground signal which results from shifting the 7 signals MMAD00+ thorugh MMAD06+, one position to the right to address the right hand word of the two word segment descriptor. Signals MMAD00+ through MMAD06+ are received as a part of the logical address from a CPU program register 16-24.

Six ALU's are used to generate the main memory 9 address of the segment descriptor. The ALU's are 74AS181A logic circuits described in the *TTL Data Book for Design Engineers*, 2nd Edition, published by Texas Instruments.

The two ALU's 16-12 add the low order eight bits of the base address signals TSTB15+ through 22+, which are applied to the A input, to the 8 bit displacement, signals ADDR15+ through ADDR22+, which are applied to the B input. A MUX 16-8 selected the eight displacement signals MMAD00-06 and ground to generate the signals ADDR15+ through ADDR22+.

Four ALU's 16-16 receive the 15 high order base address signals ADDR00+ through ADDR14+ at the A input. A MUX 16-10 selects the 15 signals TSTB00-14 to generate the 15 signals ADDR00+ through ADDR14+.

Select signal ADTSTB+ applied to MUX's 16-8 and 16-10 is high since signal MMUMIS— applied to a negative OR gate 16-4 is low. Control store signal RDSTRG— is high at this time. Therefore, the signals applied to the input terminals 1 of MUX's 16-8 and 16-10 are selected. The 6 ALU's 16-12 are coupled to a carry generator 16-14 which effects either an individual carry or a ripple through carry.

The two ALU's 16-12 perform the A plus B plus carry calculation as specified by the select signals ADTSTB+ being high, signals MMUMIS— and RDSTRG+ being low and the fourth terminal being high. The four ALU's 16-16 perform the A plus carry since the four select signals AF11SO+, MMUMIS— and RDSTRG+ and MUPMAP— are low. Signal MPUMAP— when low indicates a main memory 9 operation. Signals MMAD00-14+ applied to the B input terminals of ALU 16-16 are ignored.

Also, signal MMUMIS+ applied to a negative NAND gate 16-2 is high, signal MUPMAP— is immaterial, and signal MAPPIN— is high. Therefore, signal AF11S0+ from negative OR gate 16-6 is low.

The 23 output signals GJAD00-22+ from the six ALU's 16-12 and 16-16 are applied to their respective 23 drivers 11-2 to generate 23 system bus 11 address signals BSAD00— through BSAD22— when signal MYDCNN— is low.

Figure 10:
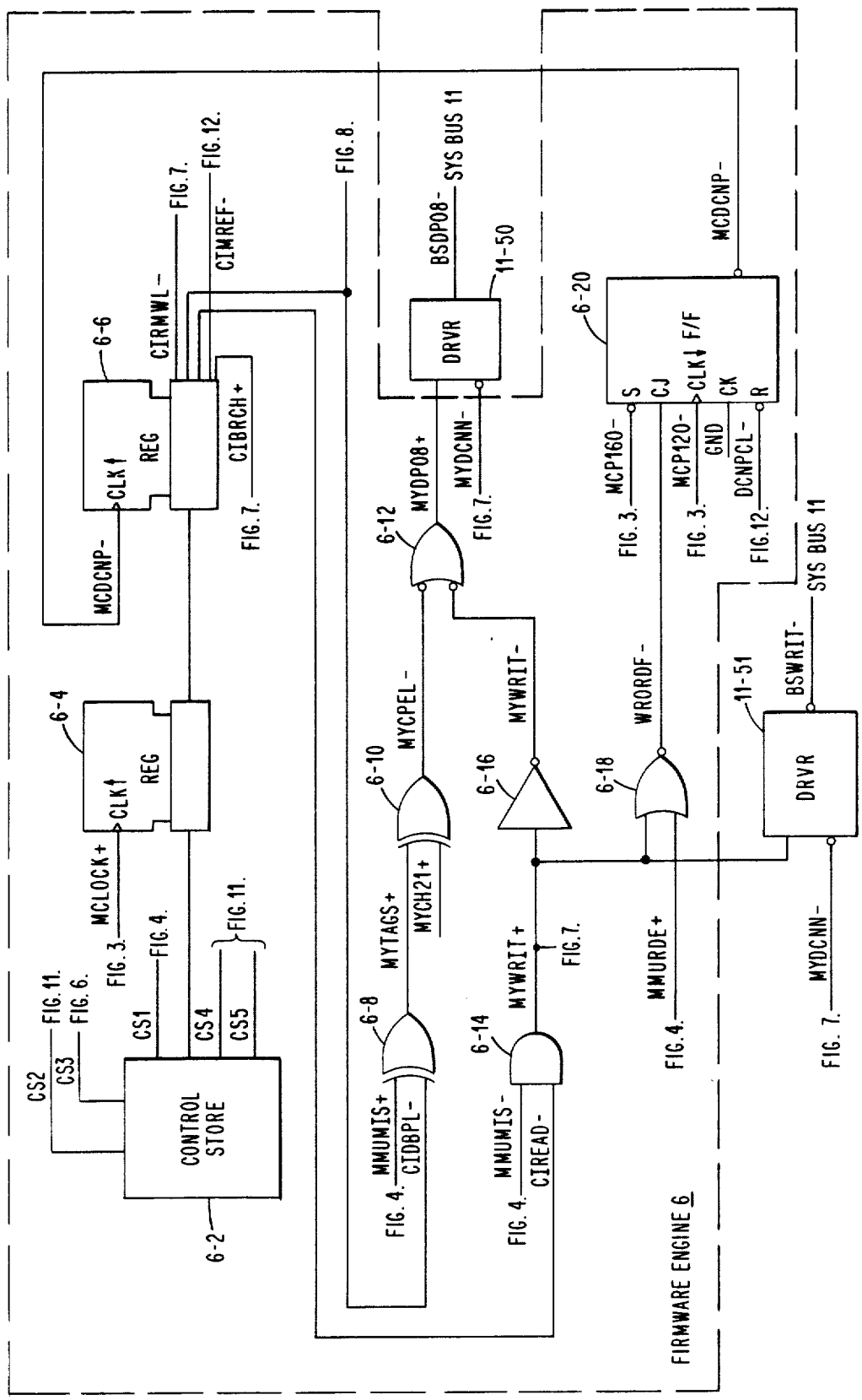
FIG. 10 is a detailed diagram of the firmware engine.

If not all the low order eight memory address signals MMAD15+ through MMAD22+ are high, that is, at least one is low, then output signal ADL255— from a NAND gate 16-18 is high. Also, control store signal CIDBPL— is high. Therefore, output signal GJDBPL— from a NAND gate 16-20 as well as control store signal CIBRLH+ from register 6-6, FIG. 10, are applied to negative OR/AND gate 10-2, FIG. 7, are low, thereby generating the double pull system bus 11 signal BSDBPL— to initiate two main memory 9 cycles during normal operation.

Figure 9:
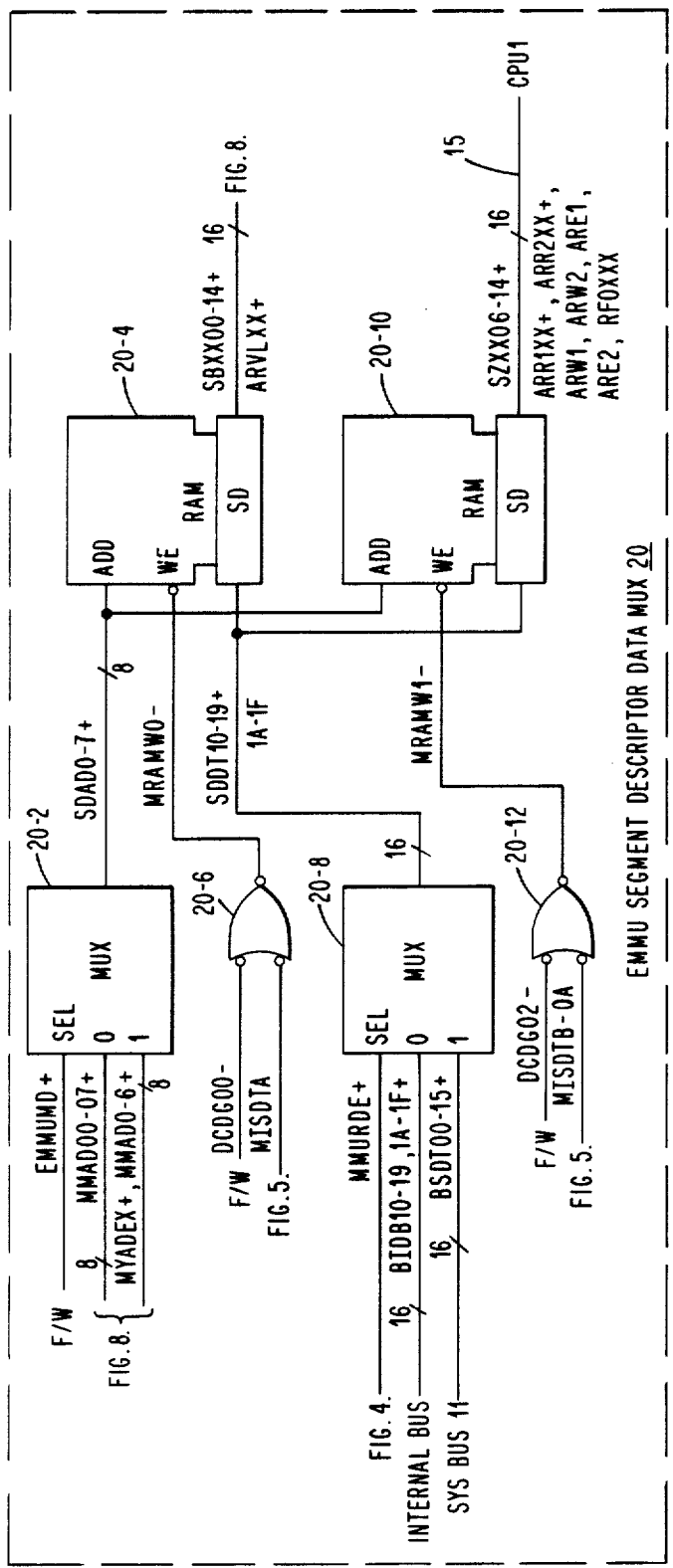
FIG. 9 is a detailed diagram of the EMMU segment descriptor data multiplexer logic.

FIG. 9 shows the EMMU segment descriptor/data MUX 20 which receives the segment descriptor from main memory 9 over system bus 11 on two demand fetch cycles as data bus signals BSDT00-15+ which are applied to the input terminal 1 of a MUX 20-8 System output data signals SDDT10+ through SSDT19+ and SDDT1A+ thorugh SDD21F+ are applied to the data terminals of random access memory (RAM's) 20-4 and 20-10. The 16 bits are stored at a location specified by address signals SDAD0-7+ which are received by a MUX 20-2 and signals MAD00-07+. The MUX 20-2 select signal EMMUMD+ generated by the firmware is high thereby selecting input terminals 1. Signal MMURDE+ is high and selects input terminals 1 of MUX 20-8. RAM 20-4 is write enabled for the first demand fetch system bus 11 cycle by signal MISDTA— which is low. Signal MISDTA— is applied to a negative NOR gate 20-6 to force signal MRAMW0— low to enable the RAM 20-4 write operation.

RAM 20-10 is write enabled for the second demand fetch cycle since signal MISDTB-0A applied to a negative NOR gate 20-12 is low forcing RAM 20-10 write enable signal MRAMW1— low. The first 16 bits of the segment descriptor are written into RAM 20-4 as the first demand fetch cycle and the second 16 bits of the segment descriptor are written into RAM 20-10 on the second demand fetch cycle.

EMMU 3 firmware signals DCDG00— and DCDG02— are applied to negative NOR gates 20-6 and 20-12 respectively and are active during normal read/write operations.

Referring to FIG. 5, a flop 8-4 is set then reset for each of the two system bus 11 cycles in which each word of the requested segment descriptor is received by the EMMU 3. Signal MYCHAN+ goes high if the information on the system bus 11 addresses the CPU 1. This sets flop 8-4 since signal MYSHCM+ from an AND gate 8-2 is high. Signal BSSHBC+ high is indicating a two cycle fetch from main memory 9 and signal BSAD19+ is high indicating a demand fetch cycle. Signal BSSHBC+ is received form system bus 11 signal BSSHBC— and a receiver 11-40. Signal BSAD19+ is received from system bus 11 signal BSDA19— and a receiver 11-41. Output signal MYSHRM— from flop 8-4 goes low thereby resetting flop 8-6 since the CJ input is low and the JK input, signal BSDPL+, is high indicating a double pull operation.

Flop 8-4 is rest after the first and second system bus 11 cycle when system bus connect signal BSDCNB+ goes low, approximately 80 nanoseconds after the start of the cycle.

Flop 8-4, when set, acknowledges each system bus 11 cycle by generating the BSACKR— signal via driver 11-42 and a negative OR gate 8-12. Also, flop 8-8 is reset by signal MYSHRM— going low since the CJ input is low and the CK input signal BSDPL— is high for the second bus cycle.

A flop 8-10 is set to indicate a data processing system error and, when set, resets flops 8-6 and 8-8 via signal SDUNAV+ high, an OR gate 8-14, signal CLRMIS+ high, an inverter 8-16 and signal CLRMIS— applied to the reset terminals of flops 8-6 and 8-8, low. Flop 8-10 sets when signal MMURDE+ is high and a not acknowledge signal BSNAKR+ is received on the rise of the my data cycle now signal MYDCNN—. System bus 11 signal BSNAKR— is applied to a receiver 11-43 to generate signal BSNAKR+ high. Receiving the not acknowledge signal requires a new request of system bus 11. Signal SDUNAV— going low sets a flop 8-26 to indicate a segment fail condition by forcing signal SEGVLD— low.

Flop 8-26 resets on the rise of the clock signal MCLOCK+ when the clock is restarted to initiate another demand fetch cycle. Signal BSMCLR+ applied to OR gate 8-14 also resets flops 8-6 and 8-8.

Flop 4-18, FIG. 4, is also reset when flop 8-10 sets and signal SDUNAV— goes low. Then signal CLRMFF+ from a negative OR gate 8-22, FIG. 5, goes high. In FIG. 4, signal CLRMFF+ forces signal RDREST— from NOR gate 4-12 low resetting flop 4-18. Signal BSMCLR— from system bus 11 applied to NOR gate 8-22 will also reset flop 4-18.

Signals MMUMIS—, MISDTB— and MISDTA+ all high applied to a NAND gate 8-18 generate output signal DFRXSP— low to set flop 8-10 which in this case will reset flop 8-6 which was set because there was a demand fetch cycle error and the EMMU 3 did not receive the first word of the requested segment descriptor.

FIG. 9A shows the 32 bit segment descriptor which includes bit 0 as the validity bit V and is represented by signal ARVLXX+ and the 15 bit physical address of the first word of the segment descriptor in main memory 9. This is represented by signals SBXX00+ through SBXX14+.

The second word includes the 2 read protection bits RP, the 2 write protection bits WP and the two execute protection bits EP represented by signals ARR1XX+, ARR2XX+, ARW1XX+, ARE1XX+ and ARRE2XX+. Bit 22 is reserved for future use and the remaining 9 bits represented by signals SZXX06T+ thorugh SZXX14+ indicate the number of words included in the segment.

FIG. 10 shows the firmware engine 6 which generates the control store 6-2 signals which are used to temporarily override the stalled system bus 11 cycles during the demand fetch cycles.

Control store 6-2 include a number of read only memories (not shown) which generate a multitude of signals. Only those are shown which are pertinent to the invention.

The output of control store 6-2 is stored in a number of registers 6-4 on the rise of the MCLOCK+ signal. Note that the information remains in the registers 6-4 for the duration of the double fetch segment descriptor operation.

The system bus 11 control signals from register 6-4 are stored in a register 6-6 on the rise of signal MCDCNP—, an output of a flop 6-20 which is set by a clock signal MCP160— from delay line 2-20, FIG. 3, and reset on the fall of clock signal MXP160— and reset on the fall of lock signal MCP120— from delay line 2-20 when signal WRORDF— is low. Signal MMURDE+ high applied to a NOR gate 6-18 forces signal WRORDF— low to reset flop 6-20 on the fall of the signal WRORDF—. This forces signal MCDCNP— high to load register 6-6 with the appropriate signals from registers 6-4.

The correct parity for the demand fetch cycle tag bits are sent out over system bus 11 via a driver 6-22 when the signal MYDCNN— goes low. Signal MMUMIS+ high is applied to an exclusive OR gate 6-8 to force signal MYTAGS+ high. The double pull control signal CIDBPL+ is low for the segment descriptor demand fetch operation. Signal MYCPEL— is low because both input signals to an exclusive OR gate 6-10 are high. Signal MYCH21+ indicates that the EMMU 3 is addressed. Signal MYDP08+, the output of a negative OR gate 6-12, goes high forcing signal BSDPO8— low on system bus 11.

During the demand fetch cycle, signal MMUMIS— is low. This forces signal MYWRIT+, the output of an AND gate 6-14 low. Signal MYWRIT+ is sent out over system bus 11 as signal BSWRIT— high to indicate a main memory 9 read demand fetch cycle. Also, during normal operation, signal MYWRIT+ when high will also generate the system bus 11 priority signal BSDPO8— via an inverter 6-16, signal MYWRIT— low, negative OR gate 6-12, signal MYDP08— high and driver 6-12. Signal MYWRIT+ is also applied to NOR gate 6-18 to reset flop 6-20 in order to load register 6-6 during normal operation.

Signal CIRMWL— from register 6-6 is applied to negative NAND gate 10-10, FIG. 7, and, when low, supresses the system bus 11 bus clock signal BSLOCK—.

Figure 11:
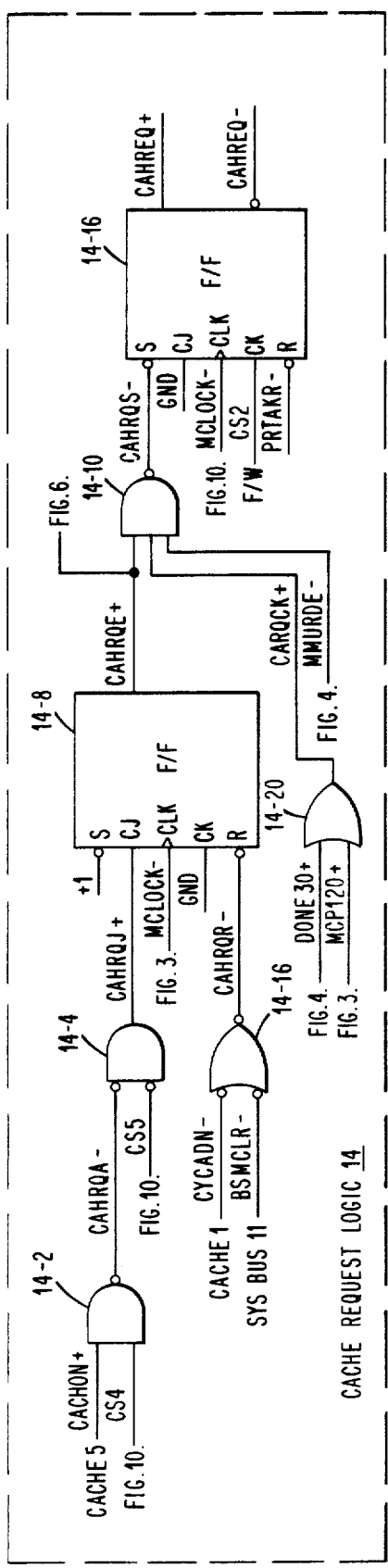
FIG. 11 is a detailed diagram of the cache request logic.

FIG. 11 shows the cache request logic 14 which shows the setting of a flop 14-16 to request data from cache 5 of FIG. 1. The setting of flop 14-16 is prevented by signal MMURDE— which is applied to a NAND gate 14-10 and, when low, forces the signal CAHRQS— high. The S input terminal high gives control of the resetting of flop 14-16 to the fall of clock signal MCLOCK— when firmware signal CAREQK+ is high since the CJ terminal is low.

The normal cache request operation sequence occurs when signal CS4+ from control store 6-2 FIG. 10 is applied to a NAND gate 14-2 and goes high. Signal CACHON+ is high indicating cache 5 is operative. This forces signal CAHRQA— low. When control store 6-2 signal CS5— goes low, then signal CAHRQJ+, the output of a negative AND gate 14-4, goes high conditioning flop 14-8 to set on the fall of clock signal MCLOCK—. This forces signal CAHRQE+ high and, if this is not a demand fetch segment descriptor operation, signal MMURDE— is high and the cache request flop 14-16 sets if control store signal CS2 is high. Flop 14-16 is reset by signal PRTAKR— which goes low on a cache done condition.

Flop 14-8 is reset at the end of a cache operation when the cache cycle done signal CYCADN— goes low forcing cache request reset signal CAHRQR from a negative NOR gate 14-6 low. Bus clear signal BSMCLR— going low will also reset flop 14-8. Signal CAHRQE+ goes low forcing signal CAHRQS— high. Flop 14-16 will therefore reset on the fall of clock signal MCLOCK— when control store signal CAREQK+ is high.

Figure 12:
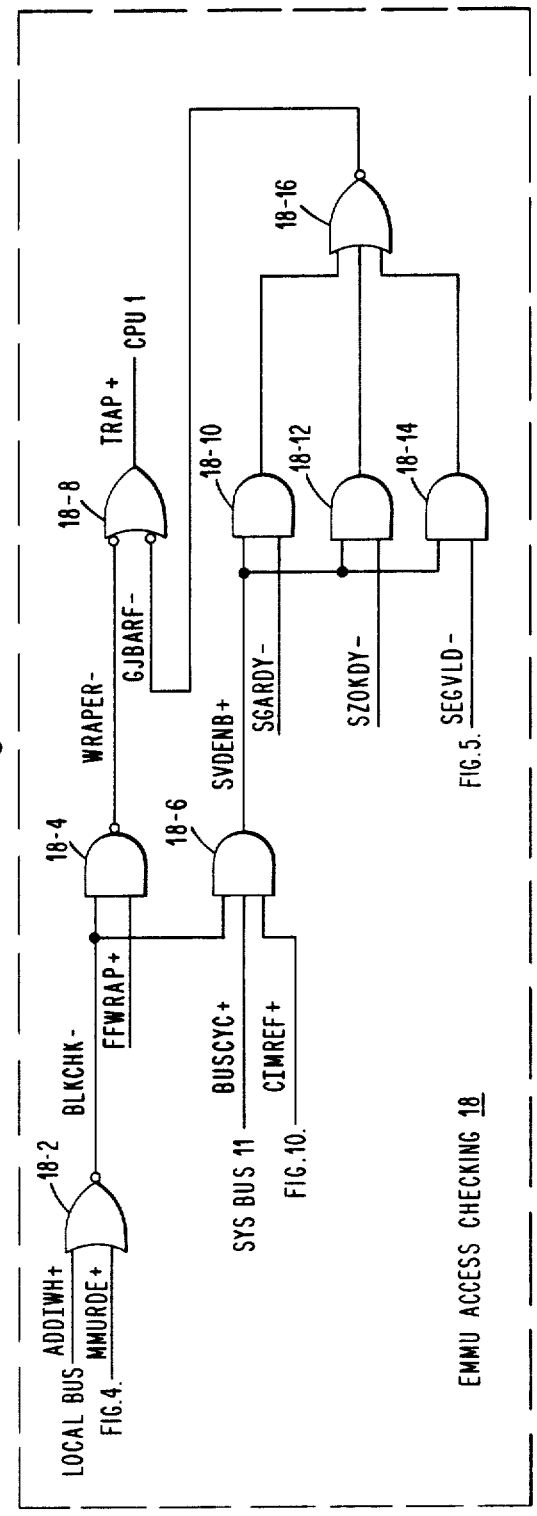
FIG. 12 is a detailed diagram of the EMMU access checking logic.

FIG. 12 shows the EMMU access checking 18 which prevents a trap operation in the event of certain error conditions associated with the segment descriptor fetch operation.

An address inhibit signal ADDINH+ high or signal MMURDE+ high forces block check signal BLKCHK— low from a NOR gate 18-2. This disables the wrap error indication signal FFWRAP+ by forcing signal WRAPER— high from a NAND gate 18-4 which in turn forces a signal TRAP+ low from a negative OR gate 18-8. Signal TRAP+ would force a firmware routine to process the indicated error condition if the trap operation were not disabled.

Also during a system bus 11 cycle, signal BUSCYC+ is high and control store signal CIMREF+ from register 6-6, FIG. 10, indicates a main memory 9 memory cycle. If signal BLKCHK— would not suppress the trap operation, then the test enable signal SVDENB+ from an AND gate 18-6 would be high and if the ring check signal SGARDY— applied to an AND gate 18-10 were high, or a size check signals SZOKDY— applied to an AND gate 18-12 were high, or a valid segment check signal SEGVLD— were high, then output signal GJBARF—, the output signal from a NOR gate 18-16 would be low and a trap operation would be initiated by signal TRAP+ high. However, signal BLKCHK— low forces output signal SVDENB+ low, which suppresses the trap.

Referring to FIG. 4, a flop 4-22 sets on the rise of signal MISDTB— which forces signal ALDONE+ high. A delay line 4-24 generates signals DONE30+ and DONE60+ which go high 60 nanoseconds respectively after signal ALDONE+. Signal DONE60+ is applied to a NOR gate 4-12 to force reset signal RDREST— low to reset flop 4-18. Signal MMURDE+ going low resets flop 4-22. Signal DONE30+ is applied to a NOR gate 14-20, FIG. 12, to generate signal CARQCK+ to condition the cache request flop 14-16 to set thereby initiating a cache 5 request when signal MMURDE— goes high if flop 14-8 had been set previously to initiate the cache 5 request.

Signal DONEA0+ from delay line 4-24 is generated 120 nanoseconds after the rise of the all done signal ALDONE+ to reset flop 4-20 via a NOR gate 4-26 and signal STLCLR—. This forces signal MRDSTL— high thereby restarting the clock by causing the MCLOCK signals to cycle. Signal CLRMFF+ applied to NOR gate 4-26 resets flop 4-24 after an error condition or a system clear.

Referring to FIG. 6, a flop 12-14 now sets on the rise of signal MMURDE—, FIG. 4, forcing signal REASKS+ high. This starts the system bus 11 request cycle to use the physical address of the segment descriptor just received to address main memory 9 to read out the next word, assuming cache 5 is not enabled.

Flop 12-8 is set by signal MYASKS—, the output of NOR gate 12-6 to generate signal MYASKK+ high to request the system bus 11 as described supra.

If the cache 1 is not enabled, signal CAHRQE+, FIG. 11, is low. Control store signal CS3, FIG. 10, conditions a flop 12-18 to reset forcing signal CRABNR+ low when the clock signal MCLOCK+ restarts. This forces signal REASKD+ high from a negative AND gate 12-16 to condition flop 12-14 to set on the rise of signal MMURDE—.

Figure 13:
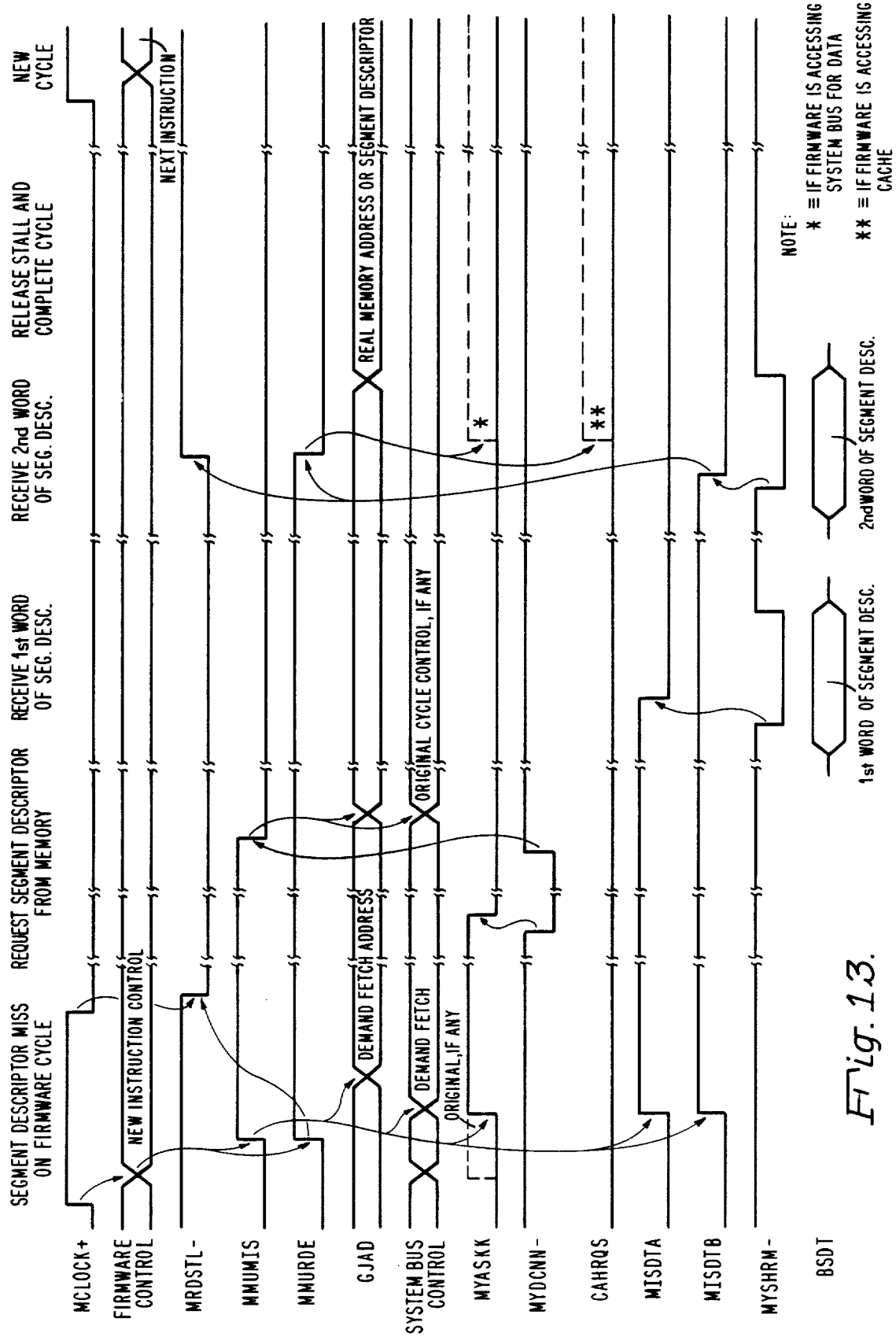
FIG. 13 is a timing diagram of the demand fetch cycle.

FIG. 13 shows a timing diagram of the demand fetch operation. The rise of the clock signal MCLOCK+ starts the new firmware cycle, firmware control by storing the control store word from control store 6-2, FIG. 10, into register 6-4. The EMMU 3 receives a logical address and requests the segment descriptor from segment descriptor table 4-2.

However, since the segment descriptor is not stored in the translation table of the EMMU 3, for this example, signals MMUMIS and MMURDE of FIG. 4 are generated. Note that signals MMURDE+, MMURDE—, MMUMIS+ and MMUMIS— are generated. A signal neumonic followed by a plus (+) high indicates that the signal performs its function when it goes high. Similarly, the same signal neumonic followed by a minus (—) sign indicates that the signal performs its function when it goes low. For simplification, therefore, this timing chart will show a sign going high when performing its function except where a plus or minus sign is indicated. Therefore, signal MRDSTL— will go low on the rise of signal MCLOCK— when signal MMURDE+ is high. This stalls the clock signal MCLOCK+ and MCLOCK— of FIG. 3.

Also, signals MMUMIS— going low and MMUMIS+ going high start the generation in FIG. 8 of the main memory 9 demand fetch address signals GJAD00-22+, which are sent out over the system bus 11 to main memory 9 as signals BSAD00-22—.

FIG. 7 shows the generation of the system bus 11 control signals, bus request BSREQT—, double pull BSDBPL—, and the demand fetch tag bit BSTD11— which is later returned as BSAD19+.

The MYASKK signals are generated by signal MMUMIS+ in FIG. 6. Signal MYASKK+ generates the signal MYREQT+ which goes out over system bus 11 as the bus request signal BSREQT— in FIG. 7. Signal MYREQT+ going high generates the my data cycle now signal MYDCNN— which gives the EMMU 3 access to the system bus 11.

Signal MMUMIS— going low in FIG. 5 generates signal MISDTA, which loads the first word of the segment descriptor into the translation table RAM20-4 of FIG. 9 and generates signal MISDTB-0A, which loads the second word of the segment descriptor into RAM 20-10.

Signal MYSHRM— of FIG. 5 goes low each time the EMMU 3 recevies the system bus 11 information having the CPU 1 channel number and signal MYCHAN+ goes high. The EMMU 3 will receive both segment descriptor words on a different system bus 11 cycles. Signal MISDTA resets on the fall of the first occurrence of MYSHRM—, and signal MISDTB resets on the fall of the second occurrence of MYSHRM—.

The demand fetch operation is essentially over on the fall of MISDTB. The clock, therefore, is restarted by signal MISDTB setting the all done flop 4-22 causing signal MRDSTL to rise in FIG. 3 to start a new cycle by reading out the next instruction. Also, signal MMURDE is reset to its normal condition on the rise of signal MISTDB—, which sets flop 4-22, FIG. 4, which in turn resets flop 4-18 via delay line 4-24 and NOR gate 4-12.

Once the EMMU 3 capture the system bus 11 by signal MYDCNN— going low, signal MMUMIS completes its job and resets to its normal state on the rise of signal MYDCNN—, which sets flop 10-34 in FIG. 7 and signal BSACKF+ going high resets flop 4-6, FIG. 4.

Signal MYDCNN— goes high in FIG. 7 when CPU 1 receives an acknowledge response BSACKR+, in this example, from system bus 11.

Once the demand fetch operation is over, the 23 GIADOO-22+ signals represent either a real main memory 9 address or a segment descriptor.

Note that the firmware may access the system bus 11 for data. In that case, signal MYASKK is set by the new firmware control word when signal MMURDE+ is low. Also, if the EMMU 3 requests data from cache 5, the cache request CAHRQS will go high on the fall of signal MMURDE+.

While the invention has been shown and described with reference to the preferred embodiment thereof, it will be understood by those skilled in the art that the above and other changes in form and detail may be made therein without departing from the spirit and scope of the invention.

What is claimed is:

1. A data processing system includes a central processing unit (CPU), a main memory coupled in common to a system bus, and a memory management unit (EMMU) coupled to said CPU, said main memory storing information words in segments, each word location of said segments being addressed by a physical address of a first word location of said segments to which is added a displacement, said EMMU including a translation table for storing segment descriptors which include said physical address, said EMMU being responsive to a logical address from said CPU for reading out one of said segment descriptors from said translation table, said EMMU and said CPU having apparatus for fetching said one of said segment descriptors from main memory via said system bus if said one of said segment descriptors is not found in said translation table, said apparatus comprising:

segment descriptor detection means for generating a first signal indicating that a requested segment descriptor is not present in said translation table;

missing segment descriptor logic means coupled to said segment descriptor detection means and responsive to said first signal for generating a stall signal, a missing signal and a read enable signal;

clock means coupled to said missing segment descriptor logic means and responsive to said stall signal which stalls a cyclic clock signal thereby suspending normal operation of said EMMU and said CPU;

bus request means coupled to said system bus and said missing segment descriptor means and responsive to said missing signal for generating a bus request signal over said system bus;

bus connect means coupled to said system bus and said bus request means and responsive to said bus request signal and an acknowledge signal received from said system bus and indicating that said system bus is available to said CPU for generating a bus connect signal for coupling said CPU to said system bus;

address generating means coupled to said missing segment descriptor logic means and said bus connect means and responsive to said missing signal for generating an address indicating the location in said main memory of said requested segment descriptor, and responsive to said bus connect signal for sending said address over said system bus to said main memory;

translation table means coupled to said system bus and said missing segment descriptor logic means and responsive to said read enable signal for receiving said requested segment descriptor from said main memory via said system bus for storage in said translation table location;

reset means coupled to said translation table means and said missing segment descriptor logic means and responsive to a plurality of control signals for resetting said stall signal, said missing signal and said read enable signal, the clock means being responsive to said reset stall signal for restarting said clock; and restart means coupled to said clock means and said missing segment descriptor means and said bus request means and responsive to said cyclic clock signal and the reset read enable signal for generating said bus request signal for processing said requested segment descriptor.

2. The apparatus of claim 1 wherein said segment descriptor detection means comprises:

present bit logic means responsive to said logical address for generating said first signal if said requested segment descriptor is not present.

3. The apparatus of claim 2 wherein said missing segment descriptor logic means comprises:

first flop means responsive to said first signal and a rising edge of said cyclic clock signal for generating said missing signal;

second flop means responsive to said first signal and said rising edge of said cyclic clock signal for generating said read enable signal; and third flop means responsive to said first signal, a falling edge of said cyclic clock signal and said read enable signal for generating said stall signal in a first state.

4. The apparatus of claim 3 wherein said clock means comprises:

delay line means responsive to a cyclic third signal for generating a cyclic second signal and said cyclic clock signal; and gating means responsive to said cyclic second signal and said stall signal in a second state for generating said cyclic third signal, and responsive to said stall signal in said first state for stalling said cyclic third signal, said delay line means being responsive to said stalled cyclic third signal for stalling said cyclic second signal and said cyclic clock signal.

5. The apparatus of claim 4 wherein said bus request means comprises:

fourth flop means responsive to said missing signal for generating a fourth signal; and fifth flop means responsive to said fourth signal for generating said bus request signal over said system bus; and seventh flop means responsive to said missing signal for generating a data control signal.

6. The apparatus of claim 5 wherein said bus connect means comprises:

gating means responsive to said bus request signal and a response from said system bus to said bus request signal, said response including said acknowledge signal for generating a fifth signal;

sixth flop means responsive to said fifth signal for generating said bus connect signal; and tenth flop means responsive to said acknowledge signal and said bus connect signal for generating a bus acknowledge signal, said first flop means being responsive to said bus acknowledge signal for resetting said missing signal.

7. The apparatus of claim 6 wherein said address generating means comprises:

register means for storing said displacement;

adding means for receiving said logical address and said displacement and responsive to said missing signal for adding said displacement to said logical address for generating address signals representing said address; and driver means responsive to said bus connect signal for sending said address signals over said system bus to said main memory for addressing said location storing said segment descriptor and reading out data signals representative of said segment descriptor.

8. The apparatus of claim 7 wherein said translation table means comprises:
   multiplexer means responsive to said read enable signal for selecting said data signals;
   memory means responsive to said data control signal for storing said data signals received from said system bus at said location specified by said logical address; and
   eighth flop means responsive to a plurality of control signals for generating a reset signal, said seventh flop means being responsive to said reset signal for resetting said data control signal.

9. The apparatus of claim 8 wherein said reset means comprises:
   ninth flop means responsive to the reset data control signal for generating an all done signal;
   delay line means responsive to said all done signal for generating a first done signal for resetting said second flop means for resetting said read enable signal, and generating a second done signal for resetting said third flop means thereby restarting said cyclic clock signal.

10. The apparatus of claim 9 wherein said restart means comprises:
    eleventh flop means responsive to the reset read enable signal and said cyclic clock signal for generating a restart signal; and
    said fourth flop means being responsive to said restart signal for generating said fourth signal which is applied to said fifth flop means for generating said bus request signal over said system bus.

11. A memory management system for fetching a missing segment descriptor from a main memory, said system comprising:
    a system bus;
    said main memory coupled to said system bus and storing information in segments and storing a segment descriptor for each segment which includes a physical address of a first word of said each segment in said main memory;
    a memory management unit having means for detecting said missing segment descriptor and means for generating an address of a location in main memory of said missing segment descriptor in response to an indication from said detection means; and
    a CPU coupled to said system bus and said memory management unit and including:
    (a) means for stalling a system clock upon receiving said indication of said missing segment descriptor for suspending normal operation of said CPU;
    (b) means for connecting to said system bus for sending said address received from said memory management unit to said main memory, said address indicating a location of said missing segment descriptor;
    (c) means for receiving said missing segment descriptor read from said location in main memory via said system bus for storage in a translation table in said memory management unit; and
    (d) means for restarting said system clock for performing a required operation on a word in said main memory in a segment specified by said missing segment descriptor.

12. A data processing system includes a central processing unit (CPU), a main memory coupled in common to a system bus, and a memory management unit (EMMU) coupled to said CPU, said main memory storing information words in segments, each word location of said segments being addressed by a physical address of a first word location of said segments to which is added a displacement, said EMMU including a translation table for storing segment descriptors which include said physical address, said EMMU being responsive to a logical address from said CPU for reading out one of said segment descriptors from said translation table, said EMMU and said CPU having apparatus for fetching said one of said segment descriptors from main memory via said system bus if said one of said segment descriptors is not found in said translation table, said apparatus comprising:
    missing segment descriptor means for generating a first signal indicating that a requested segment descriptor is not present in said translation table;
    clock means coupled to said missing segment descriptor and responsive to said first signal which stalls a cylic clock signal thereby suspending normal operation of said EMMU and said CPU;
    address generating means coupled to said missing segment descriptor means and responsive to said first signal for generating an address of a location in said main memory storing said requested segment descriptor;
    bus connect means coupled to said system bus and said address generating means and responsive to said first signal for sending said address over system bus to said main memory and receiving said requested segment decriptor via said system bus for storage in said translation table, said bus connect means further receiving a second signal; and
    restart means coupled to said system bus and responsive to said second signal for restarting said cyclic clock signal for continuing the operation requiring said requested segment descriptor.

* * * * *